United States Patent Office 3,466,261
Patented Sept. 9, 1969

3,466,261
POLYOLEFINS STABILIZED BY THIOESTERS OF ANTIMONIOUS ACID
Otto Mauz, Niederhofheim, Taunus, Germany, assignor to Farbwerke Hoechst Aktiengesellschaft vormals Meister Lucius & Bruning, Frankfurt am Main, Germany, a corporation of Germany
No Drawing. Filed Jan. 5, 1967, Ser. No. 607,399
Claims priority, application Germany, Jan. 15, 1966, F 48,174
Int. Cl. C08f 45/62
U.S. Cl. 260—45.75                4 Claims

ABSTRACT OF THE DISCLOSURE

Homo- and copolymers of olefins stabilized against the degradation caused by light and heat, containing as stabilizers 0.1 to 5% by weight, referred to the polymer, of an antimony compound of the formulae:

I 

or

II 

wherein $R_1$, $R_2$ and $R_3$ represent alkyl radicals containing 6 to 20, preferably 12 to 18 carbon atoms, or the group —$(CH_2)_n$—$COO \cdot R_4$, $n$ representing a whole number in the range of from 1 to 12, preferably 1 to 4, and $R_4$ representing an alkyl radical containing 1 to 20, preferably 12 to 18 carbon atoms, $R_5$, $R_6$ and $R_7$ represent hydrogen atoms or alkyl radicals containing 1 to 18, preferably 12 to 18, carbon atoms and Ar represents a phenyl or naphthalene ring.

The present invention provides a stabilized mixture of polyolefins and a process for preparing it.

The action of atmospheric oxygen on polyolefins causes their oxidative degradation that is considerably accelerated at elevated temperatures or in the presence of light. This degradation very adversely affects the elasticity and the toughness and thus the service durability of the shaped article made from polyolefins.

In order to avoid or retard this degradation, it has already been proposed to use organic compounds, for example aromatic amines and phenols, as stabilizers in polyolefins.

Most stabilizers, however, have various disadvantages which, under certain circumstances, considerably restrict their use. Thus, compounds of the class of the aromatic amines, for example 4,4'-diamino-diphenylamine or phenyl-β-naphthyl amine derivatives, are very good stabilizers, but they have the great disadvantage of being strongly discolored at high temperatures and, in most cases, more or less toxic. As to their stabilizing effect, phenol derivatives are inferior to aromatic amines and also tend to discolor in the presence of air and light, owing to their easy conversion into quinoid structures.

I have now found that bromo- and copolymers of olefins can be stabilized against the degradation caused by light and heat, by using as stabilizers 0.1 to 5% by weight, referred to the polymer, of an antimony compound of the general formulae:

I 

or

II 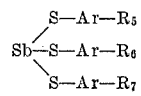

in which $R_1$, $R_2$ and $R_3$ represent identical or different alkyl radicals containing 6 to 20, preferably 12 to 18 carbon atoms, or the group —$(CH_2)_n$—$COO \cdot R_4$, $n$ representing a whole number in the range of from 1 to 12, preferably 1 to 4, and $R_4$ representing an alkyl radical containing 1 to 20, preferably 12 to 18 carbon atoms, and $R_5$, $R_6$ and $R_7$ represent hydrogen atoms or alkyl radicals containing 1 to 18, preferably 12 to 18, carbon atoms and Ar represents a phenyl or naphthalene ring.

The antimony compounds of the Formulae I and II have a good stabilizing effect in polyolefins. This stabilizing effect is extraordinarily surprising, since, for example, the known thio-dialkanoic acid esters as such are little effective and only yield good stabilizing effects in combination with phenolic compounds.

Compared with the thio-dipropionic acid esters, the sulfur-containing antimony compounds used as stabilizers according to the invention have the advantage of being less easily extractable from the polyolefin, assuming stearic reasons. For example, two test specimens, each containing 1% by weight of trithio-antimonious acid tri-octadecyl ester and thio-dipropionic acid dioctadecyl ester, respectively, have been stabilized and then extracted with methylene chloride in a Soxlet-apparatus. The extracts have been concentrated by evaporation and the residues have been examined. The result of the examination was that the thio-dipropionic acid octadecyl ester had been extracted from the test specimen, whereas in the specimen stabilized with trithio-antimonious acid tri-octadecyl ester no antimony could be found in the extract.

Another essential advantage of the stabilizing effect is the compatibility of the stabilizer with the polymer. For example in compounds of Formula I, it is thus advantageous to choose a radical $R_4$ containing as many as possible carbon atoms, if $n$ is a small number, and inversely.

As polyolefins to be stabilized according to the invention, there are mentioned polyolefins containing tertiary carbon atoms, preferably polypropylene and polybutene. Polyolefins, such as high-pressure polyethylene or low-pressure polyethylene which contain more or less side chains due to side reactions, may also be stabilized according to the present invention.

As sulfur-containing antimonious acid esters used according to the invention there may be mentioned in particular the following:

Trithio-antimonious acid tri-octyl ester
Trithio-antimonious acid tri-dodecyl ester
Trithio-antimonious acid tri-hexadecyl ester
Trithio-antimonious acid tri-octadecyl ester
Trithio-antimonious acid tri-(4-dodecyl-phenyl ester)
Trithio-antimonious acid tri-(acetic acid dodecyl ester)
Trithio-antimonious acid tri-(propionic acid octadecyl ester)
Trithio-antimonious acid tri-(butyric acid octyl ester).

The sulfur-containing antimony compounds used as stabilizers according to the invention are prepared in known manner, for example by reacting antimony(III) oxide or antimony(III)chloride with mercaptanes, thiophenol, alkyl-thiophenol, thionaphthol or mercapto-alcanic acid esters.

The stabilizer is advantageously introduced into the polyolefins to be stabilized by mixing a large amount of stabilizer with a small amount of polyolefin. For this purpose, a concentrated solution of the stabilizer in a low-boiling solvent, for example acetone or methylene chloride, is mixed with a small amount of the pulverulent polymerization product to be stabilized in such a ratio that the mixture contains about 30 to 40% by weight of stabilizer after the solvent has been evaporated.

According to this method, there is obtained a dry powder that can be incorporated in known manner into the polymer to be stabilized, to yield the desired concentration of stabilizer in the finished mass. The stabilizer can, of course, also be incorporated while the polymerization products are being prepared or worked up. This working method has the particular advantage of protecting the polymer against light and oxygen, in particular at elevated temperatures, already at an early stage, i.e. still during the preparation or work up.

It is also possible to incorporate the stabilizer together with other known age-resisters, pigments or usual additives into the polyolefins for an easier processing.

The polyolefins stabilized according to the invention can be processed into shaped articles according to known molding methods, for example by compression molding, injection molding and extrusion molding.

The following examples serve to illustrate the invention, but they are not intended to limit it thereto.

EXAMPLES

An acetonic solution of the stabilizers mentioned in the following table was mixed with polypropylene powder in such a proportion that the stabilizer concentration calculated on the polypropylene amounted to 1.0% by weight. The stabilized polypropylene powder was dried in vacuo at 50° C. and then molded into round plates of a thickness of 1 mm. and a diameter of 120 mm. Molding conditions: temperature 200° C., a contact pressure ranging from 5 to 10 atmospheres for 10 minutes, a molding pressure of 100 atmospheres for 2 minutes. Several test strips of a breadth of 10 mm. and a length of 100 mm. each were punched from every plate, hung up freely in a drying chamber and tempered at 140° C. under access of air. As a measure for their thermostability was determined the period of embrittlement. By this period was understood the period, measured in days, after which the test strips stored at 140° C. broke on having been bent by 180°, or started decomposing in a special pulverulent form which is typical of polypropylene.

The following table comprises the test results:

TABLE

| Test No. | Stabilizers | Concentration in percent by weight | Period of embrittlement in days at 140° C |
|---|---|---|---|
| 1 | Trithio-antimonious acid-tri-octyl ester. | 1 | 22 |
| 2 | Trithio-antimonious acid-tri-dodecyl ester. | 1 | 39 |
| 3 | Trithio-antimonious acid-tri-hexadecyl ester. | 1 | 41 |
| 4 | Trithio-antimonious acid-tri-octadecyl ester. | 1 | 43 |
| 5 | Trithio-antimonious acid-tri-(4-dodecyl phenyl ester). | 1 | 29 |
| 6 | Trithio-antimonious acid-tri-(acetic acid dodecyl ester). | 1 | 34 |
| 7 | Trithio-antimonious acid-tri-(propionic acid-octadecyl ester). | 1 | 37 |
| 8 | Trithio-antimonious acid-tri-(butyric acid octyl ester). | 1 | 37 |

I claim:
1. A stabilized polyolefin composition consisting of a polyolefin and 0.1 to 5% by weight, calculated on the polymer, of an antimony compound of the general formulae

(I) 

or (II) 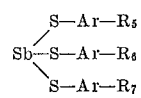

in which $R_1$, $R_2$ and $R_3$ represent identical or different alkyl radicals containing 6 to 20 carbon atoms, or the group $-(CH_2)_n-COO \cdot R_4$, $n$ representing a whole number in the range of from 1 to 12 and $R_4$ representing an alkyl radical containing 1 to 20 carbon atoms, and $R_5$ $R_6$ and $R_7$ represent hydrogen atoms or alkyl radicals containing 1 to 18 carbon atoms and Ar represents a phenyl or naphthalene ring.

2. A composition according to claim 1 wherein $R_1$, $R_2$ and $R_3$ contain 12 to 18 carbon atoms, $R_4$ contains 12 to 18 carbon atoms, $R_5$, $R_6$ and $R_7$ contain 12 to 18 carbon atoms and $n$ is a whole number from 1 to 4.

3. A composition according to claim 1 wherein the polyolefin is selected from the group consisting of polypropylene, polybutylene, low-pressure and high-pressure polyethylene containing side chains due to side reactions, the antimony compound is present in an amount of 0.005 to 5% by weight, calculated on the polymer and the antimony compound is selected from the group consisting of trithio-antimonious acid tri-octyl ester, trithio- antimonious acid tri-dodecyl ester, trithio-antimonious acid tri-hexadecyl ester, trithio-antimonious acid tri-octadecyl ester, trithio-antimonious acid tri-(4-dodecyl-phenyl ester), trithio-antimonious acid tri-(acetic acid dodecyl ester), trithio-antimonious acid tri-(propionic acid octadecyl ester) and trithio-antimonious acid tri-(butyric acid octyl ester).

4. A composition as claimed in claim 1, wherein polyolefins selected from the group consisting of polypropylene, polybutylene, low-pressure polyethylene and high-pressure polyethylene containing side chains due to side reactions, are stabilized.

References Cited

UNITED STATES PATENTS 2,680,726   6/1954   Weinberg et al. _____ 260—45.75
2,684,956   7/1954   Weinberg et al. _____ 260—45.75
3,341,464   9/1967   Susi et al. _____ 260—45.75

DONALD E. CZAJA, Primary Examiner

V. P. HOKE, Assistant Examiner